United States Patent [19]

Murano et al.

[11] Patent Number: 5,022,287
[45] Date of Patent: Jun. 11, 1991

[54] METHOD OF CONTROLLING CLUTCH OF CONTINUOUSLY VARIABLE TRANSMISSION SYSTEM

[75] Inventors: Katsuaki Murano; Sadayuki Hirano; Yoshinori Yamashita, all of Shizuoka; Takumi Tatsumi; Hiroaki Yamamoto, both of Hyogo, all of Japan

[73] Assignees: Suzuki Jidosha Kogyo Kabushiki Kaisha, Shizuoka; Mitsubishi Denki Kabushiki Kaisha, Tokyo, both of Japan

[21] Appl. No.: 229,909

[22] Filed: Aug. 8, 1988

[30] Foreign Application Priority Data

Aug. 10, 1987 [JP] Japan ................ 62-199412

[51] Int. Cl.⁵ .................. B60K 41/14; B60K 41/22
[52] U.S. Cl. ........................ 74/866; 74/867; 192/3.58; 192/103 F; 192/109 F
[58] Field of Search ........... 74/866, 867; 192/85 R, 192/109 F, 103 F, 3.58

[56] References Cited

U.S. PATENT DOCUMENTS

| | | | |
|---|---|---|---|
| 4,616,530 | 10/1986 | Tanaka et al. | 74/872 X |
| 4,648,496 | 3/1987 | Petzold et al. | 192/103 R X |
| 4,714,145 | 12/1987 | Kurihara et al. | 192/0.052 |
| 4,765,450 | 8/1988 | Kurihara et al. | 192/3.58 X |
| 4,793,454 | 12/1988 | Petzold et al. | 192/85 R X |
| 4,807,132 | 2/1989 | Arai et al. | 74/866 X |
| 4,858,498 | 8/1989 | Bouda | 74/866 |

FOREIGN PATENT DOCUMENTS

| | | |
|---|---|---|
| 57-186656 | 11/1982 | Japan . |
| 59-43249 | 3/1984 | Japan . |
| 59-77159 | 5/1984 | Japan . |
| 61-233256 | 10/1986 | Japan . |

Primary Examiner—Allan D. Herrmann
Assistant Examiner—Benjamin Levi
Attorney, Agent, or Firm—Flynn, Thiel, Boutell & Tanis

[57] ABSTRACT

A method of controlling a clutch of a continuously variable transmission system which controls a transmission system by either expanding or contracting the width of a channel between a stationary pulley member and an axially movable pulley member to expand or contract the radius of rotation of a belt wound on the pulleys to eventually vary the belt ratio. The continuously variable transmission system includes a controller unit which executes a control operation by feeding actually detected clutch pressure back to an objective clutch pressure, and an oil-pressure circuit which controls oil pressure in response to signals from the controller unit. The control system implements the sequential steps of (a) delivering a variety of signals denoting the status of the driven vehicle to said controller unit, and (b) causing the controller unit to output signals to the oil-pressure circuit when the controller unit identifies the presence of a hold mode before eventually causing the oil-pressure circuit to control the clutch pressure to a predetermined level.

11 Claims, 5 Drawing Sheets

FIG. 6 (Schedule 1)

FIG. 7 (Schedule 2)

METHOD OF CONTROLLING CLUTCH OF CONTINUOUSLY VARIABLE TRANSMISSION SYSTEM

CROSS REFERENCE TO RELATED APPLICATIONS

This application is related to our copending applications filed concurrently herewith and entitled (1) METHOD OF CONTROLLING CONTINUOUSLY VARIABLE TRANSMISSION SYSTEM (U.S. Ser. No. 07/229 899), now U.S. Pat. No. 4,926,716. (2) METHOD OF CONTROLLING LINE PRESSURE OF CONTINUOUSLY VARIABLE TRANSMISSION SYSTEM (U.S. Ser. No. 07/229,900) now U.S. Pat. No. 4,958,538. (3) METHOD OF CONTROLLING CLUTCH PRESSURE OF CONTINUOUSLY VARIABLE TRANSMISSION SYSTEM (U.S. Ser. No. 07/229,893, now U.S. Pat. No. 4,856,380) and (4) HYDRAULIC CONTROL METHOD FOR CONTINUOUSLY VARIABLE SPEED CHANGE GEAR MECHANISM FOR A VEHICLE AND A DRIVE CONTROL METHOD FOR A PRESSURE VALVE THEREOF (U.S. Ser. No. 07/229,942) now U.S. Pat. No. 4,964,317. The disclosures of these copending applications are incorporated herein by reference.

FIELD OF THE INVENTION

The present invention relates to a method of controlling a clutch of a continuously variable transmission system and, more particularly, to a method of controlling a clutch of a continuously variable transmission system by controlling a clutch pressure to a predetermined level when a hold mode is activated so that a clutch-engaging condition can optionally be varied, thus eventually improving the effectiveness of an engine brake during slow-speed driving, and at the same time, minimizing clutch-engaging shock.

BACKGROUND OF THE INVENTION

Any conventional vehicle is provided with a transmission system between an internal combustion engine and the driving wheels. Any conventional transmission system varies the driving force and speed of the wheels in accordance with widely variable driving conditions of the vehicle itself to allow the engine to fully exert its own performances. In conjunction with the transmission system, there are a variety of continuously variable transmission systems like those which are disclosed in official publications of Japanese Patent Laid-Open Nos. 57-186656 (1982), 59-43249 (1984), 59-77159 (1984), and 61-233256 (1986) for example. Any of these conventional continuously variable transmission systems transmits the driving force by either expanding or contracting the radius of rotation of a belt by either expanding or contracting the width of a belt channel formed between a stationary pulley member secured to the revolving shaft and a movable pulley member which is axially movably mounted to the revolving shaft so that the movable pulley member can come into contact with and move away from the stationary pulley shaft to vary the belt drive ratio.

The controlling of a clutch of a conventional continuously variable transmission system causes a switch to remain inactivated during the hold mode, while only the clutch engaged pressure is held at an objective clutch pressure, and thus the clutch-engaged condition (i.e., the creeping amount) remains constant. As a result, the control loop does not have the factor controlling the clutch engaging condition in response to the number of revolutions per unit of time of the engine. This causes the driver to feel a sense of incongruity, namely, hearing the sound of a fast running engine and noting a slow moving vehicle. In addition, since the clutch pressure sharply rises when entering into the start mode, certain shock may be generated when the driver causes the vehicle to begin moving.

Furthermore, since the clutch-engaged condition is not variable by the shift-lever position, engine braking cannot be applied while driving the vehicle at a slow speed despite the driver's intention. Furthermore, when the vehicle starts to move on a down slope, since the controller unit does not control the clutch-engaged condition, engine braking cannot be applied at all.

The primary object of the invention is to fully overcome those disadvantages mentioned above by providing a novel method of controlling a clutch of a continuously variable transmission system by implementing the provision of the following: a clutch-pressure controlling oil-pressure circuit which controls the clutch pressure in response to signals from a controller unit which controls clutch pressure by feeding actually-detected clutch pressure back to an objective clutch pressure; means for causing the controller unit to receive a variety of signals denoting the vehicle-driving conditions and output signals to the oil-pressure circuit when identifying the presence of a hold mode; and means for causing the oil-pressure circuit to properly control the clutch pressure to the predetermined level. As a result, the clutch-engaged condition can be varied by clutch pressure, thus significantly improving the engine-braking effect when the vehicle runs at a slow speed, and at the same time effectively minimizing the clutch-engaging shock.

To achieve the above object, a system for controlling the continuously variable transmission related to the invention controls transmission by either expanding or contracting the width of a belt channel between a stationary pulley member and an axially movable pulley member to either expand or contract the radius of rotation of a belt wound on these pulleys for eventually varying the belt ratio, in which the transmission control system embodying the invention is provided with the following: a controller unit which executes control by feeding actually-detected clutch pressure back to the objective clutch pressure; and an oil-pressure circuit which controls clutch pressure in response to signals from the controller unit. In addition, the clutch control method is comprised of the sequential steps of: delivering a variety of signals denoting the status of the drive vehicle to the controller unit; and causing the controller unit to deliver output signals to the oil-pressure circuit when the controller unit identifies the presence of a hold mode before eventually causing the oil-pressure circuit to control the clutch pressure to the predetermined level.

Functional advantages

By implementing the method of controlling the continuously variable transmission system, when driving a vehicle under the hold mode, the controller unit delivers signals to the oil-pressure circuit, which then adjusts the clutch pressure to the predetermined level. This allows the clutch pressure to vary the clutch engaging condition, thus significantly improving the engine braking effect while driving the vehicle at a slow speed and minimizing the clutch engaging shock.

BRIEF DESCRIPTION OF THE DRAWINGS

FIGS. 1 through 9 are respectively the preferred embodiments of the invention wherein:

DETAILED DESCRIPTION

Referring now more particularly to the accompanying drawings, preferred embodiments shown in FIGS. 1 through 9 are described below.

Figure 8:
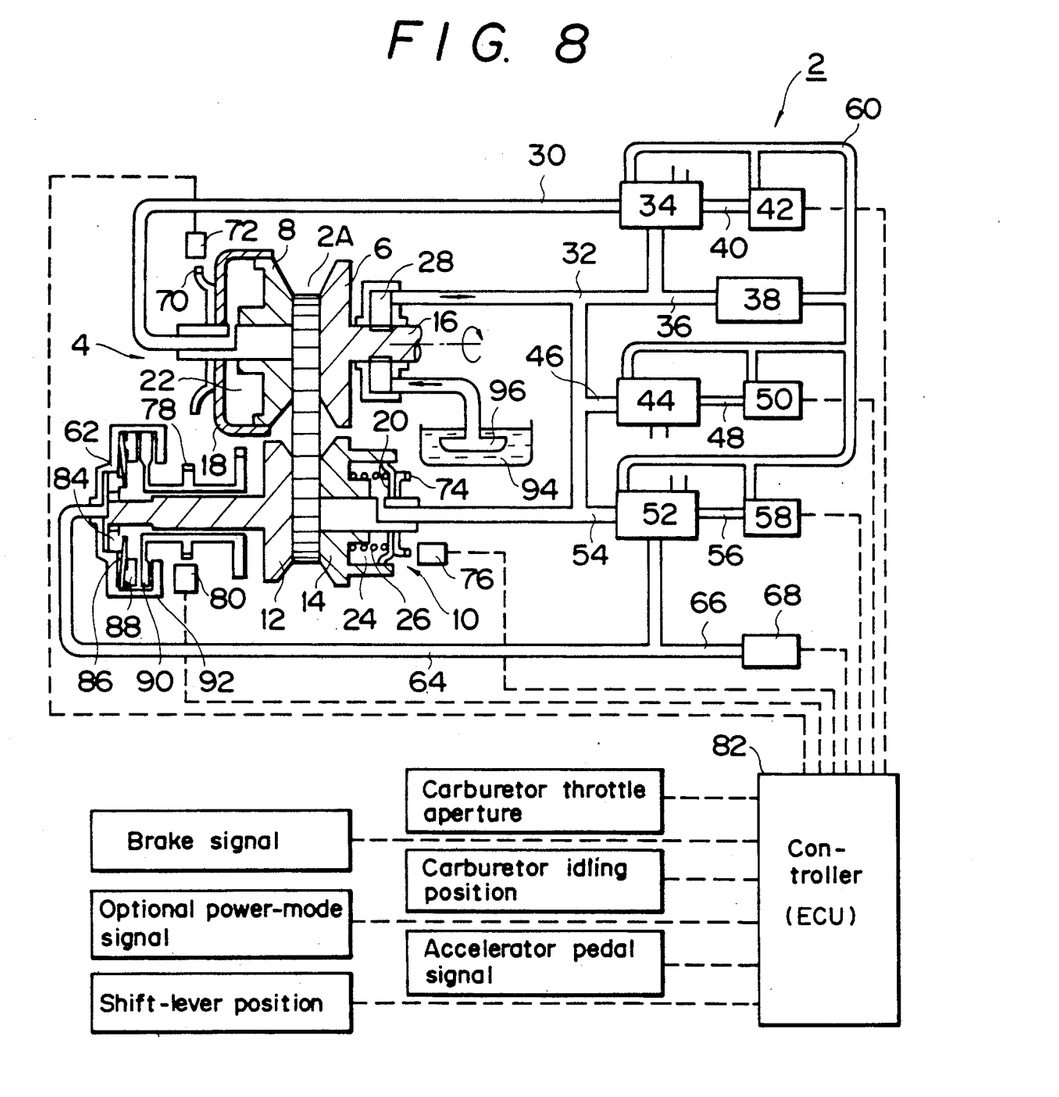
FIG. 8 is the schematic block diagram of a belt-driven continuously variable transmission system related to the invention.

First, refer to FIG. 8. The continuously variable transmission control system embodying the invention typically incorporates the following: a belt-driven continuously variable transmission 2, a belt 2A, a driving pulley 4 having a stationary pulley member 6 and a movable pulley member 8, and a driven pulley 10 having a stationary pulley member 12 and a movable pulley member 14. The driving pulley 4 shown in FIG. 8 has the stationary pulley member 6 secured to a rotating output shaft 16 of a variable speed internal combustion engine. The movable pulley member 8 is also part of the pulley 4 and is movable in the axial direction of the output shaft 16 but is nonrotatable relative to it. The pulley members 12 and 14 are similarly mounted. First and second housings 18 and 20 are respectively mounted to the pulley members 8 and 14, respectively. These housings 18 and 20 respectively constitute first and second oil-pressure chambers 22 and 24. Energizing means 26 composed of a spring is provided in the second oil-pressure chamber 24 to urge the movable pulley member 14 axially toward the stationary pulley member 12.

An oil pump 28 is driven by the output shaft 16 and delivers oil to the first and second oil-pressure chambers 22 and 24 via first and second oil paths 30 and 32. A primary pressure control valve 34, which is substantially the transmission control valve, is used for controlling the primary pressure, i.e., the input shaft sieve pressure, and is provided intermediate the length of the first oil path 30. A constant-pressure control valve 38 is provided for reducing 5 through 25 kg/cm² of line pressure to 1.5 through 2.0 kg/cm² of constant pressure, the input thereof being connected to the first oil path 30 through the primary pressure control valve 34 via a third oil path 36. A first three-way electromagnetic valve 42 is connected to the primary pressure control valve 34 via a fourth oil path 40 so that the primary pressure can properly be controlled.

A line pressure control valve 44 having a vent-valve function is connected intermediate the length of the second oil path 32 via a fifth oil path 46 so that the line (pump) pressure can properly be controlled. A second three-way electromagnetic valve 50 is connected to the line-pressure control valve 44 via a sixth oil path 48. Furthermore, a clutch-pressure control valve 52 is connected intermediate the length of the second oil path 32 to the second oil pressure chamber 24 via a seventh oil path 54. A third three-way electromagnetic valve 58 is connected to the clutch pressure control valve 52 via an eighth oil path 56 so that the clutch pressure can properly be controlled.

The primary pressure control valve 34, the first three-way electromagnetic valve 42 which controls the primary pressure, the constant pressure control valve 38, the line pressure control valve 44, the second three-way electromagnetic valve 50 which controls the line pressure, the third three-way electromagnetic valve 58 and the clutch pressure control valve 52 are respectively connected to each other via a ninth oil path 60. The clutch pressure control valve 52 is connected to the oil-pressure driven clutch 62 via a tenth oil path 64, and a pressure sensor 68 is connected midway along the length of the tenth oil path 64 via an eleventh oil path 66. The pressure sensor 68 directly detects oil pressure when the controlling clutch pressure is in the hold and start modes, thus contributing a generating instruction to apply the detected oil pressure to the objective clutch pressure. In addition, since the clutch pressure is equivalent to the line pressure during the drive mode, direct detection of oil pressure also makes a contribution to the line pressure control.

Engine output/input shaft revolution detecting gear 70 is mounted to the outside of the first housing 18. The first revolution detector 72 of the input shaft is installed in a position close to the external periphery of the input shaft revolution detecting gear 70. Output shaft revolution detecting gear 74 is mounted to the outside of the second housing 20. The second revolution detector 76 is installed in position close to the external periphery of the output shaft revolution detecting gear 74. The detection signals from the first and second revolution detectors 72 and 76 are respectively delivered to the controller unit 82 so that it can identify the number of revolutions of the engine and the belt drive ratio.

The oil pressure driven clutch 62 is provided with a gear 78 for transmitting output force. A third revolution detector 80 is installed in a position close to the external periphery of the gear 78 for detecting the revolution of the final output shaft. In other words, the third revolution detector 80 detects revolutions of the final output shaft which is directly connected to the speed-reduction gear, differential gear, drive shaft, and tires, thus allowing the vehicle speed to be detected. It is also possible for the controller unit 82 to detect revolution of rotary parts in front of and behind the oil-pressure driven clutch, thus enabling a detection of the amount of the slipped clutch as well.

Control unit 82 is provided for executing overall control of the transmission system. The controller unit 82 varies the duty ratio on receipt of a variety of operating conditions including the degree of the aperture of the throttle of the carburetor (not shown) of the engine, the number of revolutions of the engine delivered from the first through third revolution detectors 72, 76, and 80, and the speed of vehicle before eventually controlling the operating conditions of the transmission system. The controller unit 82 controls the operations for opening and closing the first three-way electromagnetic valve 42 which controls the primary pressure, the constant pressure controller 38, the second three-way electromagnetic valve 50 which controls the line pressure, the third three-way electromagnetic valve 58 which controls clutch pressure, and the operation of the pressure sensor 68, respectively.

Next, functions of various signals delivered to the controller unit 82 are described below.

1. Shift-lever position detection signal

This signal controls line pressure, ratios and operations of clutch needed for implementing those modes including P, R, N, D, and L, by activating signals related to these operational modes.

2. Carburetor throttle aperture detection signal

This signal detects engine torque in reference to memory content preliminarily input to programs and determines either the objective duty ratio or the objective number of the revolution of the engine.

3. Carburetor idling position detection signal

This signal compensates for the operation of carburetor throttle aperture sensor and then improves the control accuracy.

4. Accelerator pedal position detection signal

This signal detects the intention of the driver by referring to the condition of the depressed accelerator pedal and then determines the direction of control when the driver starts to move the vehicle or during run.

5. Brake signal

This signal detects whether the driver has depressed the brake pedal, or not. If depressed, then the brake signal determines the direction of implementing control like disengagement of the clutch, for example.

6. Optional power mode selection signal

This signal allows the driver to optionally select sporty performance or economical run of the vehicle.

The reference numeral 84 denotes a piston of the oil-pressure driven clutch 62, 86 denotes a ring-shaped spring, 88 denotes the first pressurizing plate, 90 denotes a friction plate, 92 denotes the second pressurizing plate, 94 denotes an oil pan, and 96 denotes an oil filter, respectively.

Figure 1:
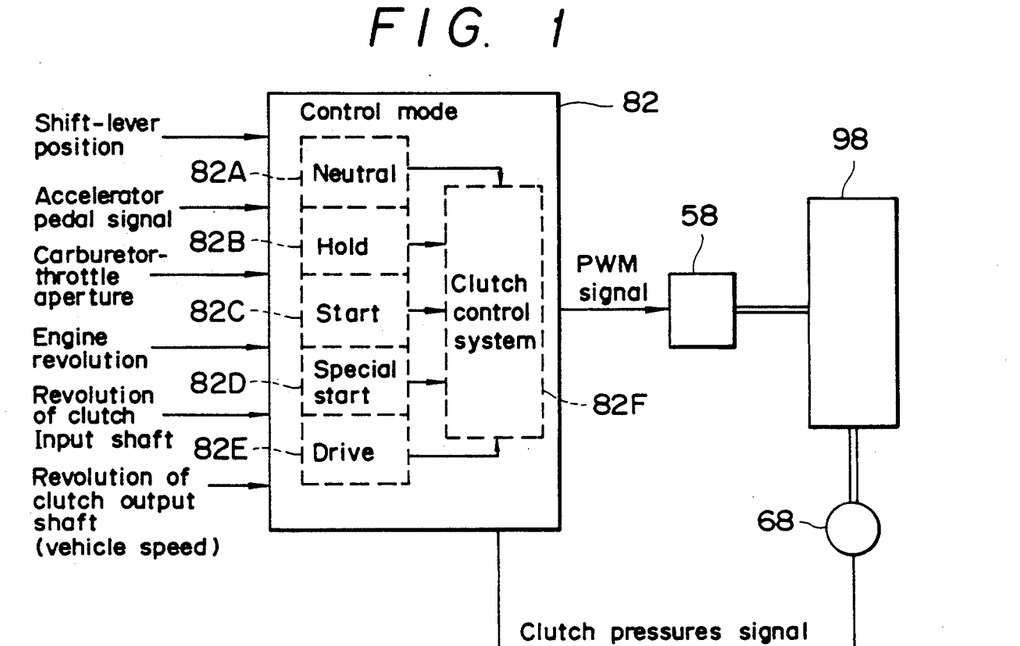
FIG. 1 is the schematic block diagram of the clutch control mechanism of a continuously variable transmission system related to the invention.

As shown in FIG. 1, the controller unit 82 incorporates a variety of control modes including Neutral 82A, Hold 82B, Start 82C, Special Start 82D, and Drive 82E, respectively. In addition, the controller unit 82 is also provided with a clutch control system 82F which receives signals from each of these control modes mentioned above. The controller unit 82 receives those signals representing the driving conditions including shift-lever position, accelerator pedal condition, throttle-aperture condition of the carburetor, number of revolutions per unit of time of the engine, number of revolutions per unit of time of the clutch input shaft, and the number of revolutions per unit of time of the clutch output shaft (i.e., running speed of the vehicle), respectively.

The clutch-pressure controlling third three-way electromagnetic valve 58 is connected to the controller unit 82. This electromagnetic valve 58 is also connected to an oil-pressure circuit 98 which controls the clutch pressure. The oil-pressure circuit 98 is connected to the controller unit 82 via the pressure sensor 68. The controller unit 82 executes a control operation by feeding back the actually-detected clutch pressure to the objective clutch pressure in accordance with the clutch-pressure signal delivered from the oil-pressure circuit 98.

Next, referring now to Table 1, conditions needed for allowing the controller unit to identify clutch control modes are described below.

1. Neutral mode

The controller unit 82 identifies the presence of Neutral mode when the shift lever is in the position N or P, and then totally reduces clutch pressure to $0 kg/cm^2$.

2. Hold mode

The controller unit 82 identifies the activation of Hold mode when the following conditions are present. Shift lever is at any of those positions including R, D, or L. Engine revolves at a minimum of 1,000 r.p.m. Clutch output shaft rotates (i.e., the vehicle moves) at a maximum speed of 8 km/h. Accelerator pedal signal remains OFF when the driver does not depress accelerator pedal at all. When the Hold mode is entered, clutch pressure controls the duty-output signal so that the objective clutch pressure can be stabilized at 3.5 $kg/cm^2$ of clutch gauge pressure by the feedback control operation executed by the controller unit 82.

3. Start mode

Figure 3:
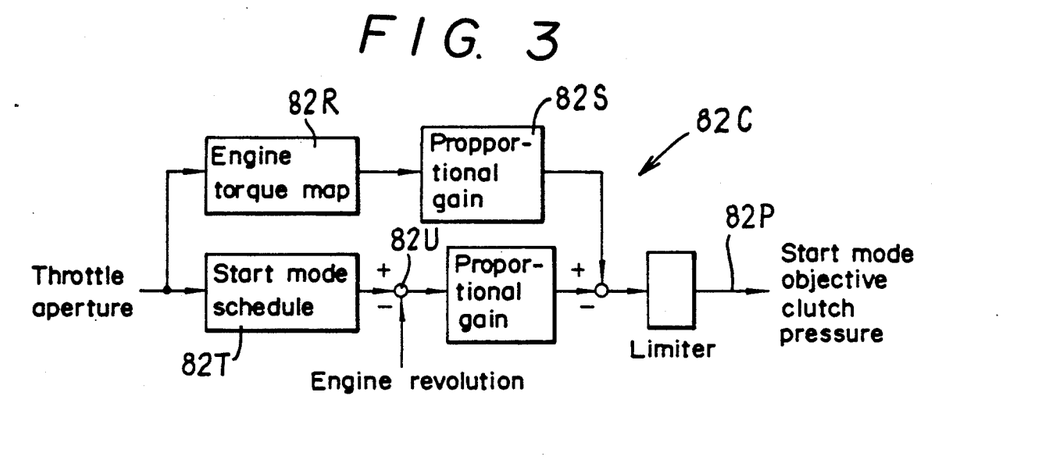
FIG. 3 is the schematic block diagram of the clutch control system for implementing the start control mode.
Figure 4:
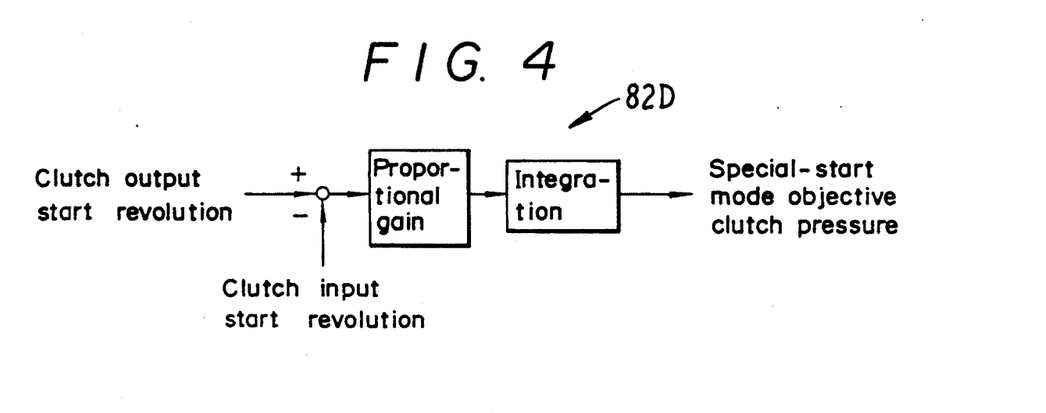
FIG. 4 is the schematic block diagram of the clutch control system for implementing the special start mode.

The controller unit 82 identifies activation of the Start mode when the following conditions are present. The shift lever is at any of those positions including R, D, or L. The clutch output shaft rotates (i.e., the vehicle moves) at a maximum speed of 8 km/h. Accelerator pedal signal remains ON and the engine revolves at a minimum of 1,000 r.p.m. As shown in FIG. 3, in reference to the engine map 82R (i.e., a specific torque value determined by the throttle aperture in reference to the preliminarily memorized engine output characteristic), engine torque generated by the throttle-aperture degree at the time of a depressing of the accelerator pedal is calculated by the controller unit 82. The calculated engine torque is then multiplied by the proportional gain 82S before eventually converting the engine torque into a transmissible clutch pressure value which is called the feed-forward amount. Furthermore, the controller unit 82 calculates the objective number of revolutions per unit of time of the engine from the identical throttle aperture in accordance with the start-mode schedule 82T, and then, the controller unit 82 executes feedback control at 82U over the number of revolutions of the engine before eventually converting the difference from the objective value into the clutch pressure value. The start-mode schedule 82T is comprised of the number of the revolutions of the engine determined by throttle aperture which is related to the engine output characteristic, where the number of revolutions of the engine output shaft is preliminarily stored in memory as a map. In conjunction with the above arithmetic operation loop 82C, the controller unit calculates an operating value (i.e., speed loop deflection) which causes the clutch pressure to rise and reduces the actual number of revolutions of the engine when the actual number of revolutions of the engine surpasses the objective number of the revolutions of engine. The controller unit 82 then establishes the start-mode objective clutch pressure 82P in reference to the feed-forwarding amount and the speed-loop difference. The controller 82 controls the actual clutch pressure by appropriately setting a duty ratio of an output signal in order that the actual clutch pressure can become the objective clutch pressure by execution of a feedback control operation.

4. Special start mode

The controller unit 82 identifies activation of a Special start mode when the clutch output shaft rotates (i.e., when the vehicle moves) at a minimum speed of 8 km/h with the shift lever being at position R, D, or L. The controller unit 82 calculates the clutch-pressure-converted value in order that the difference (i.e., the slipping amount of the clutch) between the number of rotations of the clutch input shaft and the number of rotations of the clutch output shaft can correspond to the corrected amount shown in FIG. 4. As was done for the Start mode mentioned above, the controller unit 82 controls the actual clutch pressure by applying duty output signal in order that the actual clutch pressure can become the objective clutch pressure by execution of feedback control operation to eventually implement the control of the Special start mode.

5. Drive mode

The controller unit 82 identifies an activation of Drive mode when the following conditions are present. Shift lever is at any of those positions including R, D, or L. Clutch output shaft rotates (i.e., when the vehicle moves) at a minimum speed of 8 km/h. The clutch slips itself by a maximum of 20 r.p.m. To securely lock or engage the clutch, the clutch pressure is maximized.

Table 2 summarizes the relationship between those five operational modes cited above.

Figure 2:
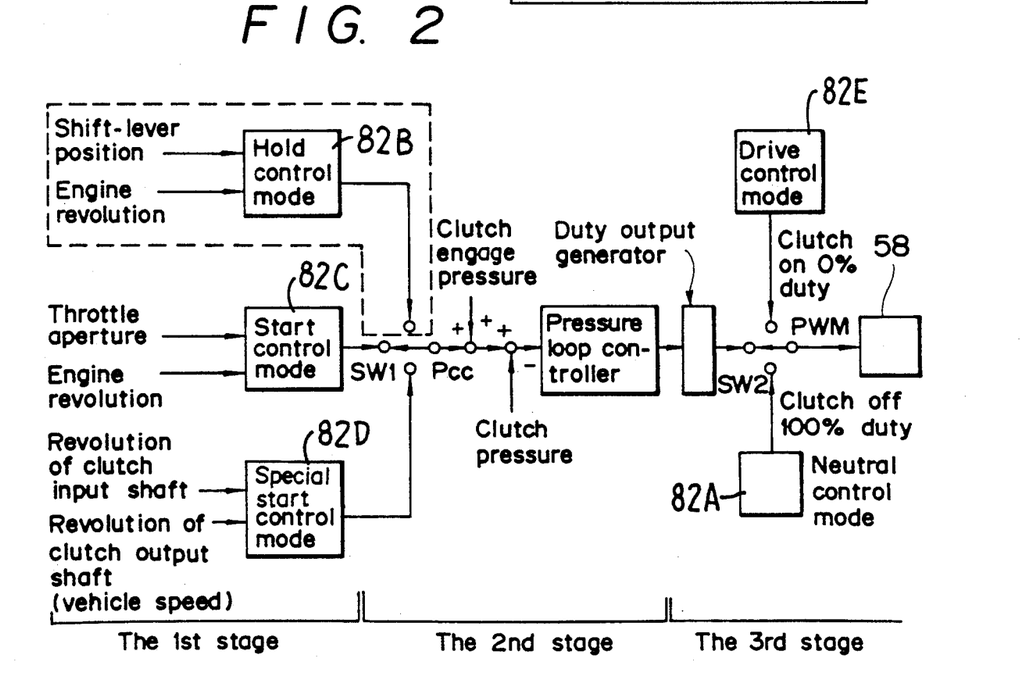
FIG. 2 is the schematic block diagram of the clutch controlling loop in conjunction with the continuously variable transmission system related to the invention.
Figure 6:
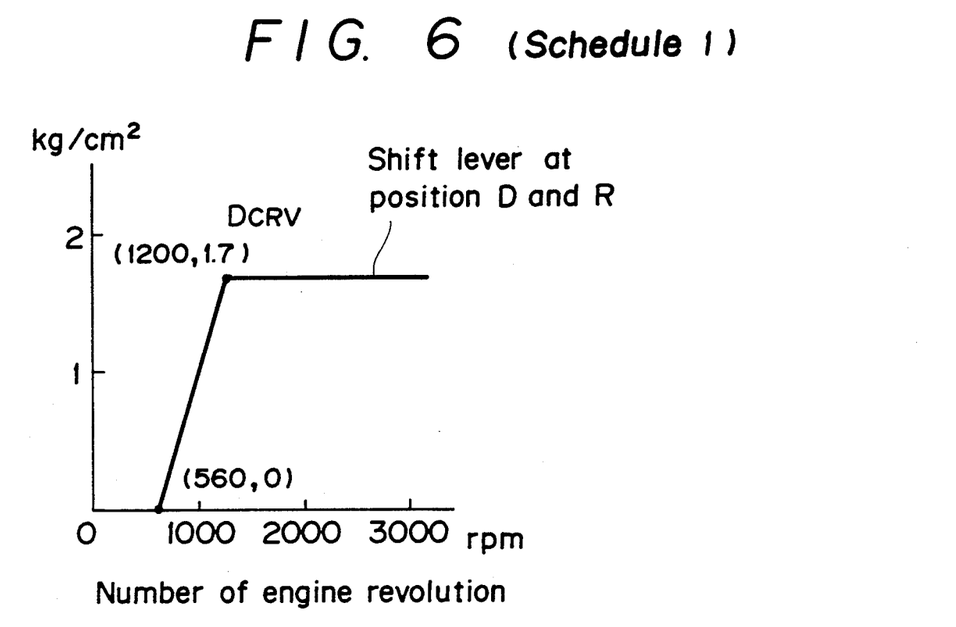
FIG. 6 is a graphical chart denoting table DCRV having a characteristic as per a hold mode schedule 1.
Figure 7:
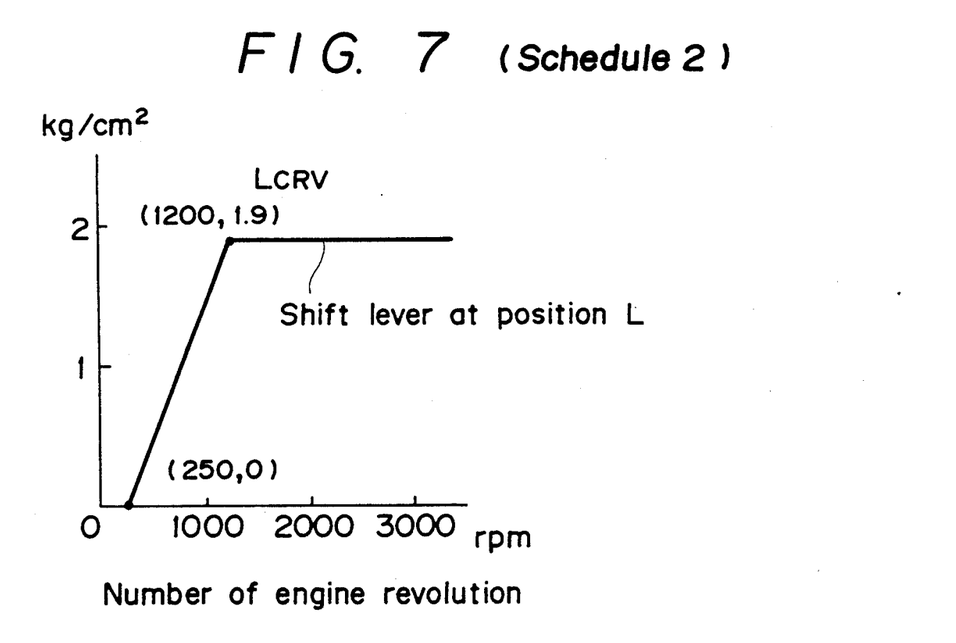
FIG. 7 is a graphical chart denoting table LCRV having a $P_{CC}$ characteristic as per a hold mode schedule 2.

See the control loop block shown in FIG. 2. When the Hold mode is entered, Hold control mode of the controller unit 82 is selected. As shown in FIGS. 6 and 7, the Hold control mode provides each shift-lever position with hold-mode schedules 1 (FIG. 6) and 2 (FIG. 7) which are determined by the number of revolutions of the engine. This preferred embodiment of the invention has merely referred to the hold-mode schedule 1 with the shift lever being at position D or R and the hold-mode schedule 2 with the shift lever being at position L. It should be understood, however, that the preferred embodiment of the invention also provides additional hold-mode schedules by the number corresponding to the number of shift-lever positions.

The invention also allows modification of those conditions to allow the controller unit to identify the hold mode and start mode as shown in Table 3. Specifically, even when the accelerator pedal position signal is ON, the controller unit 82 identifies the activation of the hold mode if the engine revolves at a maximum speed of 1,200 r.p.m.

Figure 5:
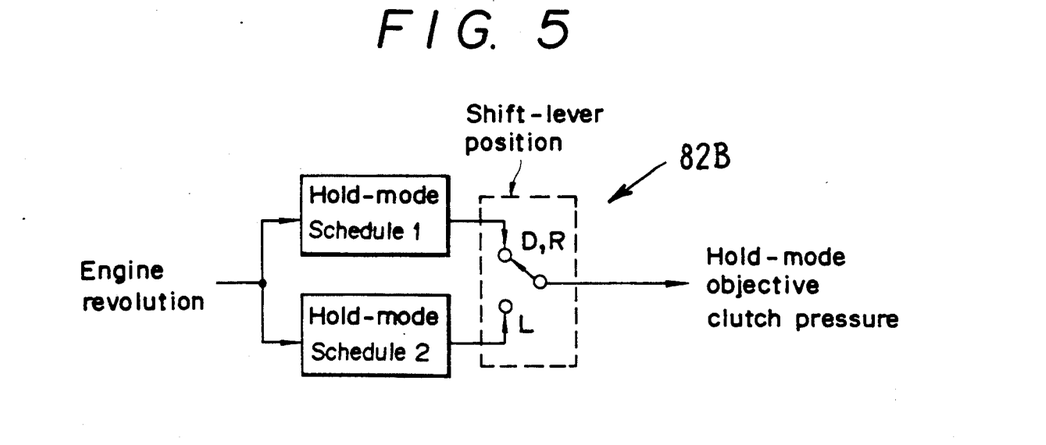
FIG. 5 is the schematic block diagram of the clutch control system for implementing the hold control mode.

When the hold mode is entered, as shown in FIG. 5, the controller unit 82 calculates the objective clutch pressure that correctly matches the number of revolutions of the engine and the selected shift-lever position in accordance with the hold mode schedules 1 and 2 corresponding to the shift-lever positions.

Referring now to FIG. 2 denoting the control-loop block diagram, the clutch control operation is described below. The clutch is controlled by the start mode 82C, special-start mode 82D, and hold mode 82B shown in FIGS. 3 through 5. As shown in the control loop block diagram shown in FIG. 2, these control modes are executed by applying a three-stage arithmetic operation.

The first stage is comprised of control means which calculates the objective clutch pressure when either the start control mode or the special start control mode is activated. The second stage is comprised of control means which calculates the correctable amount in reference to the difference $\Phi$ between the objective and actual clutch pressures by causing the controller unit 82 to execute feedback control over the clutch pressure when any of those control modes is activated. The third stage is substantially comprised of generator means which outputs duty ratio signal used for driving the electromagnetic valve 58 which controls clutch pressure. When the third stage is entered, the controller unit 82 converts the correctable amount $\Phi$ calculated by control means of the second stage into a specific duty ratio to be outputted when any of those modes including hold, start, and special start modes is activated. More particularly, controller unit 82 outputs 100% of the duty ratio under the neutral control mode 2A and 0% of the duty ratio under the drive control mode 2E, respectively.

When changing any of those control modes, for example, when transferring the hold control mode 2B to the start mode 2C, or to the special start mode 2D, the final value of the objective clutch pressure of the preceding hold control mode is used for constituting the initial value of the objective clutch pressure under the start control mode and special start control mode so that the objective clutch pressure can be prevented from going into an intermittent condition while transferring any of those control modes to another.

Figure 9:
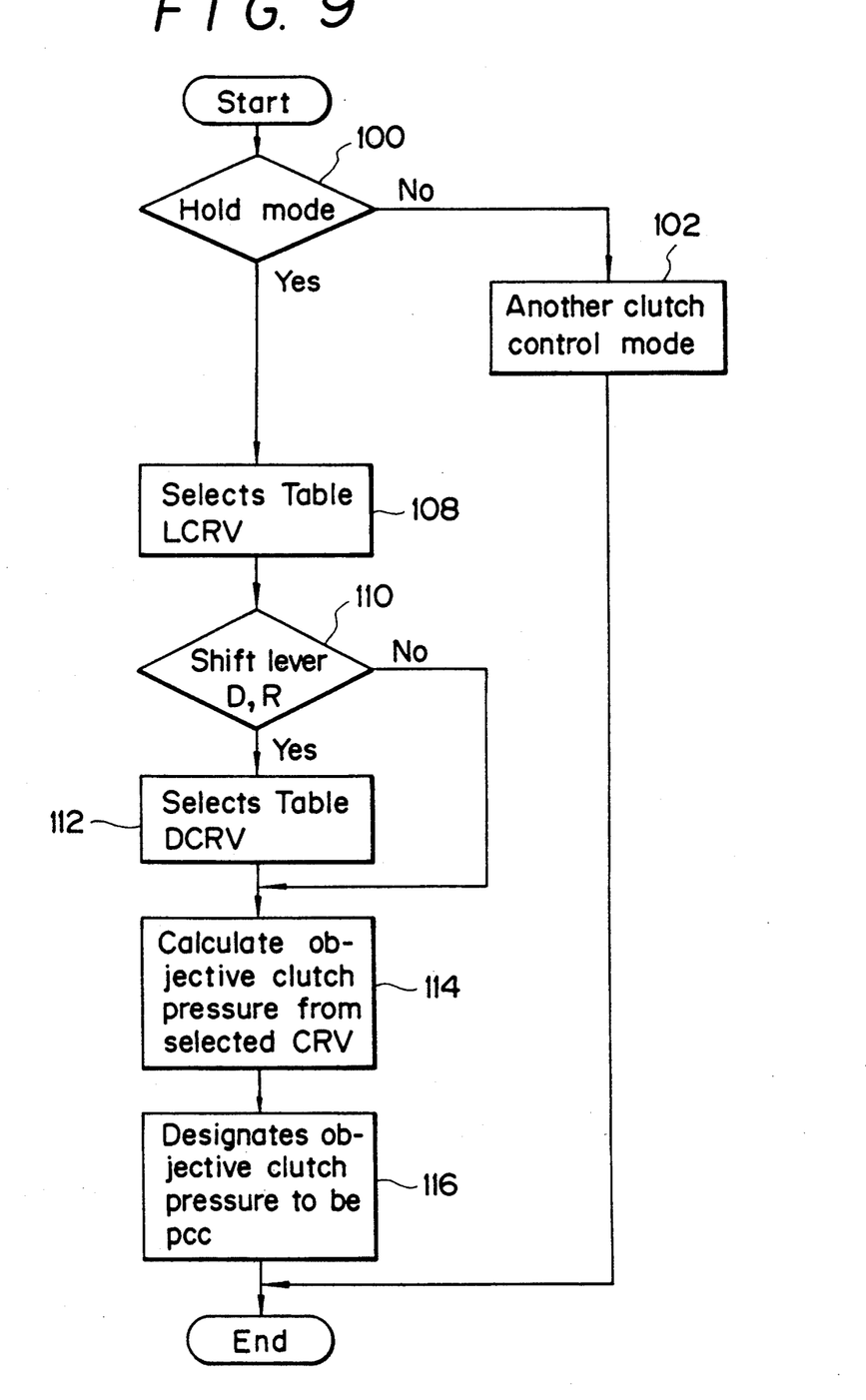
FIG. 9 is an operation flowchart denoting sequential procedures for implementing the hold control mode related to the clutch control system of the invention.

Next, referring now to FIG. 9 denoting an operational flowchart of the hold control mode, the procedure for executing a clutch control operation is described below. First, when step 100 is entered, the controller unit 82 identifies whether the hold control mode is present in the vehicle being driven, or not. If the hold control mode is absent, step 102 is then entered so that another control mode can be activated. Conversely, if the hold control mode is present, then step 108 is entered to allow the controller unit 82 to choose table LCRV (FIG. 7) having the $P_{CC}$ characteristic generated from the hold-mode schedule 2. $P_{cc}$ is an objective clutch pressure value which, in the hold control mode, is selected (FIGS. 6 and 7) in dependence on engine speed and the shift lever setting.

Next, step 110 is entered, where the controller unit 82 identifies whether the shift lever is at any of those shift-lever positions D, or R, or not. If the shift lever were present at position D or R, then, step 112 is entered to allow the controller unit 82 to choose table DCRV (FIG. 6) having the $P_{CC}$ characteristic generated from the hold-mode schedule 1. Then, step 114 is entered, where the controller unit 82 calculates the objective clutch pressure by referring to the selected table DCRV or LCRV. If the shift lever were at position L, then, the controller unit 82 chooses table LCRV, and then, the operation flow resumes step 114.

After completing those processes of step 114, step 116 is eventually entered to allow the controller unit 82 to convert the calculated objective clutch pressure into the $P_{CC}$ value to eventually complete operations in conjunction with the hold control mode.

In other words, by causing the controller unit 82 to identify the activation of the hold control mode, clutch pressure can be adjusted to the predetermined level in accordance with the shift lever position. This in turn allows the creeping amount of the vehicle to be generated, which denotes the clutch engaging condition to which drivers anxiously look forward, thus providing practical utility as well.

In addition, since the invention allows drivers to optionally choose a variety of engine-brake applicable effects according to the shift-lever positions while driving the vehicle at a slow speed, the clutch control system embodied by the invention minimizes the sense of incongruity felt by drivers, thus significantly improving driving comfort.

According to the invention, driving of any vehicle in the forward and backward directions at a slow speed can properly be controlled by applying the creeping amount which denotes the clutch-engaging condition, and as a result, the only thing needed for the driver is to adjust the throttle aperture by slightly depressing the accelerator pedal, thus minimizing operational burden and improving the operating convenience as well.

The clutch control system of the invention adjusts the clutch pressure to the predetermined level and the creeping amount denoting the clutch-engaging condition in the presence of the hold control mode according to the shift-lever positions. Accordingly, the clutch pressure can smoothly be transmitted when the hold mode is transferred to the starting mode, thus securely minimizing certain shock when the vehicle begins to move.

Normally, when the driver slows the vehicle at a down slope by depressing the brake pedal and then again releasing the brake, relative to the accelerated force, the driving force from the wheels causes the number of the revolutions of the engine to increase through the clutch. However, according to the invention, even though the above phenomenon occurs, relative to the increased revolution of engine, clutch pressure also rises in accordance with the schedule in the hold mode so that engine brake applicability can securely be promoted. This in turn reduces the slipping amount of the clutch itself so that the vehicle can enter into the drive mode from the start and special start modes very smoothly, thus minimizing the clutch engaging shock.

As is clear from the foregoing description, the invention provides an oil-pressure circuit which properly controls clutch pressure in response to signals from the controller unit executing the control by feeding the actually detected clutch pressure back to the objective clutch pressure. The clutch control system then causes various signals denoting the vehicle-driving condition to be delivered to the controller unit. When the activated hold mode is identified by the controller unit, it then outputs signals to the oil-pressure circuit, which then correctly adjusts the clutch pressure to the predetermined level. This allows the clutch pressure to vary the clutch engaging condition so that the driver's desire to gain access to this condition can be materialized, thus providing a practical advantage. In addition, the clutch control system related to the invention allows drivers to choose a variety of engine brake effects while driving the vehicle at a slow speed, thus reducing incongruity felt by the driver to eventually improve driving comfort. Since the clutch engaging condition can be made available for adjusting the control of slow-speed driving in the forward and backward directions, the driver merely needs to adjust the throttle aperture by slightly depressing accelerator pedal, thus reducing burden and improving the driving convenience as well. Furthermore, by adequately controlling the clutch engaging condition via adjustment of clutch pressure to the predetermined level while the hold mode is underway, clutch pressure can smoothly be held constant when the hold mode is transferred to the start mode. This minimizes the clutch-engaging shock when the driver causes the vehicle to begin to move. When the driver brakes the vehicle at a down slope by depressing the brake pedal and then again releasing the brake, relative to the accelerated speed, the driving force from the wheels increases the revolutions of the engine via the clutch. This in turn allows the clutch control system related to the invention to smoothly transfer the start and the special start modes to the drive mode, thus effectively minimizing the clutch-engaging shock.

Although particular preferred embodiments of the invention have been disclosed in detail for illustrative purposes, it will be recognized that variations or modifications of the disclosed apparatus, including the rearrangement of parts, lie within the scope of the present invention.

TABLE 1

| | Control mode identifying condition | | | | Clutch control output | |
|---|---|---|---|---|---|---|
| Control mode | Shift-lever position | Accelerator pedal signal | Engine revolution | Clutch output shaft revolution | PWM signal | Clutch condition |
| Neutral | N or P | X | X | X | Open-loop output 100% duty | OFF |
| Hold | R or D or L | OFF | ≧ | < | Closed-loop output Outputs duty aiming at 3.4 kg/cm² of clutch | Half clutch (creep) |
| Start | R or D or L | ON | ≧ | < | Closed-loop output outputs duty using objective value based on throttle engine revolution | Transmits engine torque to wheels |
| Special start | R or D or L | ON or OFF | > | ≧ | Closed-loop output outputs duty using objective value based on the clutch slipping amount | Synchronizes clutch input/output revolution |
| Drive | R or D or L | X | ≧ | > | Outputs open loop | ON |

TABLE 1-continued

| | Control mode identifying condition | | | | Clutch control output | |
|---|---|---|---|---|---|---|
| Control mode | Shift-lever position | Accelerator pedal signal | Engine revolution | Clutch output shaft revolution | PWM signal | Clutch condition |
| | | | | | 0% duty | (locked) |

X: No need for identifying conditions.
ON: The state in which the vehicle is about to start off with accelerator pedal being depressed.
OFF: The state in which accelerator pedal is not depressed.
<: The value is less than the established value.
>: The value is more than the established value.
≧: The value is more than or equal to the established value.

TABLE 2

A: Shifts to D, L, R
B: Shifts to N, P
C: Vehicle speed < 8 km/h with activated accelerator pedal signal at engine revolution ≧ 1000 rpm
D: Accelerator pedal signal OFF or engine revolution < 1000 rpm
E: Vehicle speed > 8 km/h
F: Vehicle speed < 8 km/h
G, H: |Clutch slipping amount| ≦ 20 rpm
I: Engine revolution < 1000 rpm or vehicle speed < 8 km/h

TABLE 3

| Mode | Shift lever | Accelerator pedal signal | Engine revolution number | Vehicle speed |
|---|---|---|---|---|
| Hold | R or D or L | OFF | X | <8 km/H |
| Hold | R or D or L | ON | <1200 rpm | <8 km/H |
| Start | R or D or L | ON | ≧1200 rpm | <8 km/H |

The embodiments of the invention in which an exclusive property or privilege is claimed are defined as follows:

1. A method of controlling a progressively engageable fluid actuated clutch of a continuously variable transmission which has a plurality of operational modes, including a hold mode, and which is provided in a vehicle having an engine drivingly coupled to said transmission, having a shift selector movable to a plurality of positions including first and second positions each selecting vehicle motion in a common direction and having an accelerator pedal movable to and from a deactuated position, comprising the steps of: causing said transmission to operate in said hold mode in response to a set of predetermined operational conditions, selecting for said hold mode a target clutch pressure as a function of engine speed and shift lever position, and feedback controlling actual fluid pressure for said clutch based on said target pressure in said hold mode.

2. A method of claim 1, including the step of selecting as said set of predetermined operational conditions said shift selector being set to either of said first or second positions when said detected vehicle speed is below a predetermined speed and said accelerator pedal is in said deactuated position.

3. A method of claim 1, including the step of selecting as said set of predetermined operational conditions said shift selector being set to either of said first or second positions when the detected vehicle speed is below a predetermined speed, the engine speed is below a predetermined speed, and said accelerator pedal is spaced from said deactuated position.

4. A method of claim 1, wherein said step of selecting said target pressure is carried out by setting said target pressure to zero when said engine speed is below a first predetermined speed, by linearly increasing said target pressure to a predetermined pressure value as said engine speed is increased from said first predetermined speed to a second predetermined speed, and by maintaining said target pressure substantially at said predetermined pressure value when said engine speed is above said second predetermined speed.

5. A method of claim 4, wherein said predetermined pressure value is respectively a first pressure value and a second pressure value and said first predetermined engine speed is respectively a first speed and a second speed when said shift selector is respectively set to said first position and said second position.

6. A method of claim 1, wherein another of said operational modes is a starting mode, said transmission changing from said holding mode to said starting mode in response to a set of predetermined operational conditions which include said vehicle speed being below a predetermined speed, said accelerator pedal being spaced from said deactuated position, and said engine having a speed above a predetermined speed.

7. A method of controlling a progressively engageable clutch of a continuously variable transmission which has a plurality of operational modes, including a hold mode, and which is provided in a vehicle having a shift selector movable to a plurality of positions which include first and second positions each selecting vehicle motion in a common direction and having an accelerator pedal movable from a deactuated state to an actuated state, comprising the steps of: detecting whether the speed of said vehicle is below a predetermined speed; detecting whether said accelerator pedal is in said deactuated state; detecting whether said shift selector is set to either of said first or second positions; causing said transmission to operate in said hold mode in response to a set of predetermined operational conditions which include said shift selector being set to either of said first or second positions when said detected vehicle speed is below said predetermined speed and said detected accelerator pedal state is said deactuated state; respectively selecting first and second objective levels of clutch engagement when said detected position of said shift selector is respectively said first position and said second position while said transmission is being operated in said hold mode; and controlling said clutch so as to shift an actual level of engagement thereof toward said selected one of said first and second objective levels of engagement when said transmission is being operated in said hold mode; including the step of detecting the speed of an engine of said vehicle; and wherein said step of selecting said first and second objective levels of clutch engagement is carried out by selecting as said first objective level of clutch engagement one of a first plurality of predetermined values corresponding to respective engine speeds and selecting as said second objective level of clutch engagement one of a second plurality of predetermined values corresponding to respective engine speeds.

8. A method as recited in claim 7, wherein said step of controlling said clutch is carried out by varying a fluid control pressure, a progressive increase in said fluid control pressure effecting a progressive increase in a level of actual clutch engagement, said step of selecting said first and second objective levels of clutch engagement being carried out be respectively selecting respective objective pressure values.

9. A method as recited in claim 8, wherein said step of controlling said clutch includes the steps of detecting an actual value of said fluid control pressure and effecting feedback control of said fluid control pressure with respect to said selected objective pressure value and said detected actual value.

10. A method of controlling a progressively engageable clutch of a continuously variable transmission which has a plurality of operational modes, including a hold mode, and which is provided in a vehicle having a shift selector movable to a plurality of positions which include first and second positions each selecting vehicle motion in a common direction and having an accelerator pedal movable from a deactuated state to an actuated state, comprising the steps of: detecting whether the speed of said vehicle is below a predetermined speed; detecting whether said accelerator pedal is in said deactuated state; detecting whether said shift selector is set to either of said first or second positions; causing said transmission to operate in said hold mode in response to a set of predetermined operational conditions which include said shift selector being set to either of said first or second positions when said detected vehicle speed is below said predetermined speed and said detected accelerator pedal state is said deactuated state; respectively selecting first and second objective levels of clutch engagement when said detected position of said shift selector is respectively said first position and said second position while said transmission is being operated in said hold mode; and controlling said clutch so as to shift an actual level of engagement thereof toward said selected one of said first and second objective levels of engagement when said transmission is being operated in said hold mode; and including an alternative set of predetermined operational conditions causing said transmission to operate in said hold mode, said alternative set of conditions including said shift selector being set to one of said first and second positions when said detected vehicle speed is below a predetermined vehicle speed, said detected accelerator pedal state is in said actuated state, and a detected speed of an engine of said vehicle is below a predetermined engine speed.

11. A method as recited in claim 10, wherein said predetermined speed of said engine is approximately 1,000 revolutions per minute and said predetermined speed of said vehicle is approximately 8 kilometers per hour.

* * * * *

UNITED STATES PATENT AND TRADEMARK OFFICE
CERTIFICATE OF CORRECTION

PATENT NO. : 5 022 287

DATED : June 11, 1991

INVENTOR(S) : Katsuaki MURANO et al

It is certified that error appears in the above-identified patent and that said Letters Patent is hereby corrected as shown below:

Column 13, line 48; replace "be" with ---by---.

Signed and Sealed this

Twenty-third Day of February, 1993

Attest:

STEPHEN G. KUNIN

*Attesting Officer*      *Acting Commissioner of Patents and Trademarks*